(12) United States Patent
Yoshii et al.

(10) Patent No.: US 6,956,731 B2
(45) Date of Patent: Oct. 18, 2005

(54) LAMINATE TYPE ELECTRONIC COMPONENT

(75) Inventors: Akitoshi Yoshii, Honjou (JP); Hideki Yokoyama, Yuri-gun (JP); Takashi Kamiya, Ichihara (JP); Atsushi Takeda, Yuri-gun (JP); Masauki Okabe, Yuri-gun (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/506,812

(22) PCT Filed: Mar. 7, 2003

(86) PCT No.: PCT/JP03/02743
§ 371 (c)(1),
(2), (4) Date: Sep. 7, 2004

(87) PCT Pub. No.: WO03/075295
PCT Pub. Date: Sep. 12, 2003

(65) Prior Publication Data
US 2005/0083637 A1 Apr. 21, 2005

(30) Foreign Application Priority Data
Mar. 7, 2002 (JP) ........................................ 2002-061663

(51) Int. Cl.⁷ ................................................. H01G 4/06
(52) U.S. Cl. ................................ 361/321.1; 361/321.2; 361/321.5
(58) Field of Search ........................ 361/311–313, 321.1, 361/321.2, 306.3; 428/407

(56) References Cited

U.S. PATENT DOCUMENTS 4,668,414 A * 5/1987 Okamura et al. ..... 252/62.51 R
5,137,783 A * 8/1992 Tanihara et al. ............ 428/407
5,252,380 A * 10/1993 Nakazumi et al. .......... 428/141
6,643,118 B2 * 11/2003 Nakamura et al. ....... 361/321.2

FOREIGN PATENT DOCUMENTS

| JP | 59-225509 | 12/1984 |
| JP | 04-337616 | 11/1992 |
| JP | 06-267784 | 9/1994 |
| JP | 08-045784 | 2/1996 |
| JP | 10-064331 | 3/1998 |
| JP | 10-284343 | 10/1998 |
| JP | 10-316901 | 12/1998 |
| JP | 10-321460 | 12/1998 |
| JP | 11-054358 | 2/1999 |
| JP | 11-162771 | 6/1999 |
| JP | 2000-138130 | 5/2000 |
| JP | 2002-025337 | 1/2002 |

* cited by examiner

*Primary Examiner*—Anthony Dinkins
(74) *Attorney, Agent, or Firm*—Oliff & Berridge, PLC

(57) ABSTRACT

A laminate type electronic component 1 has, at least, a dielectric part 2 containing a dielectric as a constituent material, and a pair of a first external electrode 31 and a second external electrode 32, each disposed in close contact with the dielectric part 2, opposing each other by way of the dielectric part 2. The dielectric part 2 has laminated dielectric layers 21a to 21f; and at least two internal electrodes 23a to 23e disposed one by one between layers adjacent each other in the dielectric layers 21a to 21f, while each being electrically connected to one of the first external electrode 31 and second external electrode 32. At least one of the internal electrodes 23a to 23e is electrically connected to the first external electrode 31, and at least one of the internal electrodes 23a to 23e is electrically connected to the second external electrode 32.

12 Claims, 2 Drawing Sheets

LAMINATE TYPE ELECTRONIC COMPONENT

TECHNICAL FIELD

The present invention relates to a laminate type electronic component and, more specifically, to a laminate type electronic component such as a laminated ceramic capacitor.

BACKGROUND ART

Switching power supplies and DC/DC converters have currently been employed in many of power supplies of electronic devices. Known as a capacitor used in these power supplies is a power supply bypass capacitor.

For the power supply bypass capacitor, an aluminum electrolytic capacitor or tantalum electrolytic capacitor having a large capacity or a laminated ceramic capacitor having a low capacity has been used according to circuit parameters such as its power capacity and switching frequency and a smoothing coil employed.

Though the electrolytic capacitors mentioned above have excellent advantages in that they can easily attain a large capacity as a power supply bypass (smoothing) capacitor, they are problematic in that they are large in size; they are poor in low-temperature characteristics; they arouse a fear of short-circuiting; their internal impedance is relatively high, so that their dielectric dissipation factor (tan δ) due to equivalent series resistance (hereinafter referred to as "ESR") is high, whereby loss occurs steadily, which generates heat; they fail to attain sufficient frequency characteristics, so that their smoothness is insufficient; etc.

On the other hand, technical innovations in recent years have advanced thin-layer forming techniques and lamination techniques for dielectric layers and internal electrodes, whereby the electrostatic capacity of laminated ceramic capacitors has been approaching that of electrolytic capacitors. Therefore, proposals to replace electrolytic capacitors with laminated ceramic capacitors have been under study.

In power supply bypass capacitors, it is important to reduce ripple noise in order to attain a sufficient smoothing action. The ripple noise can be suppressed if the ESR of the capacitor is reduced.

It is therefore preferred that capacitors having a low ESR be used in power supply bypass circuits, whereby proposals to use laminated ceramic capacitors having a low ESR in power supply circuits have been under study.

When a laminated ceramic capacitor having a low ESR (e.g., a laminated ceramic capacitor having an ESR of less than 10 mΩ) is used in a power supply circuit, however, the ESR of the smoothing circuit greatly influences phase characteristics of a feedback loop in secondary circuits such as a DC/DC converter having a feedback circuit to become a power supply and a switching power supply, in particular, the ESR may become extremely low, whereby it has been impossible to attain sufficient reliability.

Namely, when a laminated ceramic capacitor having a low ESR is employed as a power supply circuit bypass (smoothing) capacitor, the secondary smoothing circuit is equivalently constituted by L and C components alone, so that only ±90 degrees and 0 degree exist as phase components existing in the circuit, and phases have no room, whereby oscillations are easy to occur. This oscillation phenomenon has also occurred when load fluctuates in a power supply circuit using a three-terminal regulator.

For overcoming the problems mentioned above, it has been studied to add a resistance component having such a level that the oscillation phenomenon can fully be prevented from occurring to a laminated ceramic capacity having a low ESR. For example, a so-called CR composite electronic component has been proposed. For instance, Japanese Patent Application Laid-Open No. HEI 8-45784 proposes an electronic component in which an end part of a laminated ceramic capacitor is turned into a semiconductor by using a carbide and a reducing agent.

For example, Japanese Patent Application Laid-Open No. SHO 59-225509 discloses one in which a resistive paste such as ruthenium oxide is laminated on a laminated ceramic capacitor, and they are baked at the same time, so as to yield a resistive element.

Japanese Patent Publication No. 2578264 proposes a CR composite component in which a metal oxide film is provided on a surface of an external electrode, in order to attain a desirable ESR.

Also proposed is a laminated ceramic capacitor using a conductive resin as a constitute material of an external electrode. In this case, the conductive resin contains spherical or scaly particles made of a metal such as silver. The ESR of this type of smoothing capacitor (laminated chip capacitor) is relatively low in general, i.e., 10 mΩ or less. Therefore, in order for the ESR of the external electrode to rise to at least 40 mΩ, which is said to be able to sufficiently prevent the above-mentioned oscillation phenomenon from occurring, the content of the conductive material is required to be as small as possible, for which studies have been under way.

DISCLOSURE OF THE INVENTION

However, when employed in a power supply bypass circuit, all of the conventional electronic components such as those mentioned above are quite hard to sufficiently prevent the oscillation phenomenon from occurring and achieve a sufficient smoothing action, and fail to attain a sufficient reliability. Also, the above-mentioned electronic components include those having a configuration which is poor in mass productivity.

Namely, for the laminated ceramic capacitor disclosed in Japanese Patent Application Laid-Open No. HEI 8-45784, manufacturing conditions for accurately regulating its resistance value within a desirable range and a manufacturing step for satisfying the conditions become quite complicated, so that a desirable resistance value is hard to attain accurately, circuits are hard to design, the resistance value fluctuates greatly among products, and the yield is poor in the case of mass production.

Since the laminated ceramic capacitor disclosed in Japanese Patent Application Laid-Open No. SHO 59-225509 has a configuration having the above-mentioned resistive element formed by using a resistive paste such as ruthenium oxide, when an external electrode is further provided, the equivalent circuit becomes a parallel circuit of C/R or (LC)/R and fails to yield a series circuit. Also, in order for this laminated ceramic capacitor to yield a series circuit, the external electrode requires a complicated form and a complicated manufacturing step, and the manufacturing efficiency becomes low, whereby there is no configuration capable of yielding a sufficient mass productivity.

In the case of the CR composite component disclosed in Japanese Patent Publication No. 2578264, a metal oxide film is formed by heating a terminal electrode comprising nickel as a constituent material, and the thickness of the metal oxide film is adjusted by barrel polishing, whereby a desirable resistance value is obtained (see Examples). Therefore, the CR composite component is also hard to yield a desirable resistance value, the adjustment of the resistance value is troublesome, the manufacturing efficiency is low, and there is no configuration capable of yielding a sufficient mass productivity.

In the case of a laminated ceramic capacitor using a conductive resin containing spherical particles or scaly particles made of a metal such as silver as a constituent material of an external electrode, the state of contact between the particles in the conductive resin drastically becomes unstable, which makes it hard to adjust ESR to a given value stably. Though there is a method in which a resistance is connected in series to the smoothing capacitor, it is unpractical since the cost is high.

In view of the foregoing circumstances, it is an object of the present invention to provide a laminate type electronic component having such a reliability that the oscillation phenomenon can sufficiently be prevented from occurring and a sufficient smoothing action can be obtained even when employed in a power supply bypass circuit, and a configuration which is excellent in mass productivity.

As a result of diligent studies for achieving the above-mentioned object, the inventors have found that the above-mentioned object can be achieved in a laminate type electronic component having an external electrode comprising a conductive resin as a constituent material, when the value of ESR is adjusted to 40 to 150 m$\Omega$ while the fluctuation (standard deviation) of the value of ESR obtained at the time of operation is adjusted to 10 m$\Omega$ or less.

Also, the inventors have found that the value of ESR and its fluctuation (standard deviation) can be adjusted within the ranges mentioned above easily and reliably if a particle satisfying specific geometric conditions concerning its form is contained as a conductive particle contained in a conductive resin and the content of the particle is within a particular range when forming an external electrode comprising the conductive particle as a constituent material, thereby achieving the present invention.

Namely, the present invention provides a laminate type electronic component comprising at least:

a dielectric part containing a dielectric as a constituent material; and a pair of first and second external electrodes, each disposed in close contact with the dielectric part, opposing each other by way of the dielectric part;

wherein the dielectric part comprises at least two internal electrodes each electrically connected to one of the first and second external electrodes, and at least one dielectric layer made of the dielectric and disposed one by one between electrodes adjacent each other in the at least two internal electrodes;

wherein at least one of the at least two internal electrodes is electrically connected to the first external electrode, and at least one of the at least two internal electrodes is electrically connected to the second external electrode;

wherein each of the first and second external electrodes comprises at least a resin electrode layer made of a conductive resin mainly composed of a thermosetting resin and a conductive particle;

wherein the conductive resin has a conductive particle content of 70 to 75 mass %; and wherein the conductive particle contains an acicular particle having an average longitudinal length of 30 to 70 $\mu$m and an aspect ratio of 1.5 to 3.3 as a main ingredient.

The present invention can easily and reliably yield a laminate type electronic component having an ESR value of 40 to 150 m$\Omega$ with a fluctuation (standard deviation) of 10 m$\Omega$ or less in the ESR value at the time of operation. The laminate type electronic component satisfying these two electric characteristic conditions at the same time has a DC resistance or impedance within a range usable in a smoothing circuit or the like of a switching power supply circuit having various circuit constants.

Namely, the laminate type electronic component satisfying the above-mentioned two electric characteristic conditions can easily and reliably yield a laminate type electronic component having an excellent reliability, which can sufficiently prevent the oscillation phenomenon from occurring and attain a sufficient smoothing action even when employed in a power supply bypass circuit. Also, since the resin electrode layers of the external electrodes are mainly composed of the conductive particle and the thermosetting resin, they can be made easily with a favorable reproducibility so as to satisfy the above-mentioned two electric characteristic conditions. Therefore, the laminate type electronic component in accordance with the present invention is excellent in mass productivity.

When the ESR value is less than 40 m$\Omega$ here, the oscillation phenomenon occurs easily. When the ESR value exceeds 150 m$\Omega$, by contrast, the conductivity of the external electrodes (first and second external electrodes) drops remarkably, and frequency characteristics also deteriorate remarkably. If one having an ESR value exceeding 150 m$\Omega$ is employed in a power supply circuit, the current loss is so large that desirable power supply voltage and current cannot be obtained.

When the ESR value is 40 m$\Omega$ or more, the electronic component can sufficiently prevent the oscillation phenomenon from occurring even when employed in a power supply bypass circuit. The ESR value (40 m$\Omega$) to become a threshold of whether the oscillation phenomenon can sufficiently be prevented from occurring or not is a value calculated in view of various circuit constants (electrostatic capacity, inductance, and impedance) of substantially all the kinds of switching power supplies.

The inventors have also found that, when the fluctuation (standard deviation) of the ESR value exceeds 10 m$\Omega$, outputs of the power supply voltage and power supply current cannot be controlled, whereby the above-mentioned effects of the present invention cannot be obtained. From the viewpoint of controlling the output of power supply current more reliably, it will be preferred if the fluctuation (standard deviation) of the ESR value is 8 m$\Omega$ or less.

When the conductive particle content in the conductive resin constituting the resin electrode layer is less than 70 mass % in the present invention, the electric resistance of the first and second external electrodes increases so much that the electronic component cannot attain a conductivity sufficient for functioning as an electrode. When the conductive particle content in the conductive resin constituting the resin electrode layer exceeds 75 mass %, the conductivity of the first and second external electrodes increases so much that the ESR value becomes less than 40 m$\Omega$. From the foregoing viewpoint, the conductive particle content in the conductive resin constituting the resin electrode layer is 70 to 75 mass %.

As explained in the foregoing, geometric conditions concerning the form of the acicular particle to become a main ingredient of the conductive particle are as follows. Namely, it has an average longitudinal length of 30 to 70 $\mu$m and an aspect ratio of 1.5 to 3.3. When the acicular particle satisfying the above-mentioned two geometric conditions at the same time is employed as a main ingredient of the conductive particle, the laminate type electronic component satisfying the above-mentioned two electric characteristic conditions concerning the ESR can be constructed easily.

Here, "average longitudinal length" refers to an average value of major axes of acicular particles having an anisotropic shape and, more specifically, to an arithmetic average value of major axes of 30 acicular particles randomly sampled from those disposed at a cross section observed by SEM in an external electrode (first or second external electrode) to become a measurement sample. Similarly, "average latitudinal length" refers to an arithmetic average value of minor axes of 30 acicular particles randomly sampled from those disposed at a cross section observed by SEM in an external electrode (first or second external electrode) to become a measurement sample.

When the average longitudinal length of acicular particles is less than 30 μm, the ESR value decreases, or the fluctuation (standard deviation) of ESR value increases, whereby the above-mentioned effects of the present invention cannot be obtained. When the average longitudinal length of acicular particles exceeds 70 μm, the fluctuation (standard deviation) of ESR value increases, so that the above-mentioned effects of the present invention cannot be obtained.

The "aspect ratio" refers to [(average longitudinal length)/(average latitudinal length)].

When the aspect ratio is less than 1.5, the ESR value becomes lower, so that the above-mentioned effects of the present invention cannot be obtained. When the aspect ratio exceeds 3.3, the fluctuation (standard deviation) of ESR value becomes greater, so that the above-mentioned effects of the present invention cannot be obtained.

The content of the acicular particle, which is a main ingredient of the conductive particle, in the conductive particle is at least 40 mass %, preferably 40 to 75 mass %. When the acicular particle content in the conductive particle is less than 40 mass %, the electric resistance of the first and second external electrodes increases so much that they cannot obtain a conductivity sufficient for functioning as an electrode of the electronic component, whereby the above-mentioned effects of the present invention cannot be obtained. When the acicular particle content in the conductive particle exceeds 75 mass %, the conductivity of the first and second external electrodes increases so much that the ESR value is more likely to become less than 40 mΩ.

Preferably, in the present invention, the acicular particle is a particle (Ag filler) comprising Ag. The inventors have found that the above-mentioned effects of the present invention can be obtained more reliably when this particle is used.

Preferably, in the present invention, the conductive particle further contains a spherical particle having an average particle size of 3 to 20 μm therein, and has an acicular particle content of 40 to 75 mass % and a spherical particle content of 15 to 35 mass % therein.

The inventors have found that the above-mentioned effects of the present invention can be obtained more reliably when the three numerical range conditions mentioned above are satisfied at the same time in the case where the spherical particle is used together with the acicular particle.

When the average particle size of the spherical particle exceeds 20 μm, the contact resistance between spherical particles increases, so that the electric resistance of the first and second external electrodes (electric resistance of each of the resin electrode layers in the first and second external electrodes) becomes too high, whereby they are less likely to attain a conductivity sufficient for functioning as an electrode of the electronic component. When the average particle size of the spherical particle is less than 3 μm, the viscosity of a paste containing the spherical particle for forming each resin electrode layer increases, so that electrodes are harder to form.

In the present invention, "spherical particle" refers to a particle having an average particle size of 3 to 20 μm and an aspect ratio of 1.0 to 1.2. The "average particle size" of the spherical particle refers to an arithmetic average value of respective maximum particle sizes of 30 spherical particles randomly sampled from those disposed at a cross section observed by SEM in an external electrode (first or second external electrode) containing spherical particles to become a measurement sample.

If the spherical particle content in the conductive particle is less than 15 mass % when the spherical particle is used together with the acicular particle, the electric resistance of the first and second external electrodes (electric resistance of each of the resin electrode layers in the first and second external electrodes) increases so much that they are less likely to attain a conductivity sufficient for functioning as an electrode of the electronic component. When the spherical particle content in the conductive particle exceeds 35 mass %, the conductivity of the first and second external electrodes (conductivity of each of the resin electrode layers in the first and second external electrodes) increases so much that the ESR value is more likely to become less than 40 mΩ.

If the acicular particle content in the conductive particle is less than 40 mass % when the spherical particle is used together with the acicular particle, the electric resistance of the first and second external electrodes (electric resistance of each of the resin electrode layers in the first and second external electrodes) increases so much that the they are less likely to attain a conductivity sufficient for functioning as an electrode of the electronic component. When the acicular particle content in the conductive particle exceeds 75 mass %, the conductivity of the first and second external electrodes (conductivity of each of the resin electrode layers in the first and second external electrodes) increases so much that the ESR value is more likely to become less than 40 mΩ.

When the above-mentioned spherical particle is used in the present invention, it will be preferred if the spherical particle is a particle (Ag filler) comprising Ag. The inventors have found that the above-mentioned effects of the present invention can be obtained more reliably when this particle is used.

Preferably, in the present invention, each of the first and second external electrodes is further provided with a metal electrode layer comprising a metal disposed between the resin electrode layer and dielectric part.

When the resin electrode layer and the dielectric part are connected to each other by way of the metal electrode layer, the electric contact state between the resin electrode layer and the internal electrode in the dielectric part can be made better than that in the case where the resin electrode layer is directly formed on the surface of the dielectric part, whereby the electric contact resistance between the resin electrode layer and the dielectric part occurring when the resin electrode layer is directly formed on the surface of the dielectric powder can sufficiently be lowered in an easy and reliable manner. Also, by way of the metal electrode layer, the resin electrode layer can physically be secured to the dielectric part more firmly.

When the metal electrode layer is provided, it will be preferred that the metal electrode layer is formed by sintering a paste mainly composed of any of metals of Cu, Ag, Pd, Ni, and Ag—Pd alloy, from the viewpoint of sufficiently lowering the above-mentioned electric resistance and from the viewpoint of manufacturing efficiency.

Preferably, in the present invention, a Ni plating layer formed from Ni by plating is further disposed on an outer surface of the resin electrode layer. This allows the heat resistance to be attained more sufficiently in a soldering step when placing the laminate type electronic component on a wiring board, etc. As the plating in this case, electrolytic plating can be employed.

Preferably, in the present invention, an Sn plating layer formed from Sn by plating is further disposed on an outer surface of the Ni plating layer. This allows the solder and the laminate type electronic component to attain more sufficient electric and physical contact properties in a soldering step when placing the laminate type electronic component on a wiring board, etc. Electrolytic plating can be employed as the plating in this case as well.

Preferably, in the present invention, the at least two internal electrodes are disposed in the dielectric part such that one of the two internal electrodes adjacent each other by way of the dielectric layer is electrically connected to the first external electrode whereas the other is electrically connected to the second external electrode. This can yield a laminate type electronic component which is easy to be made compact and has an excellent charging/discharging efficiency.

BEST MODES FOR CARRYING OUT THE INVENTION

In the following, embodiments of the present invention will be explained in detail.

Figure 1:
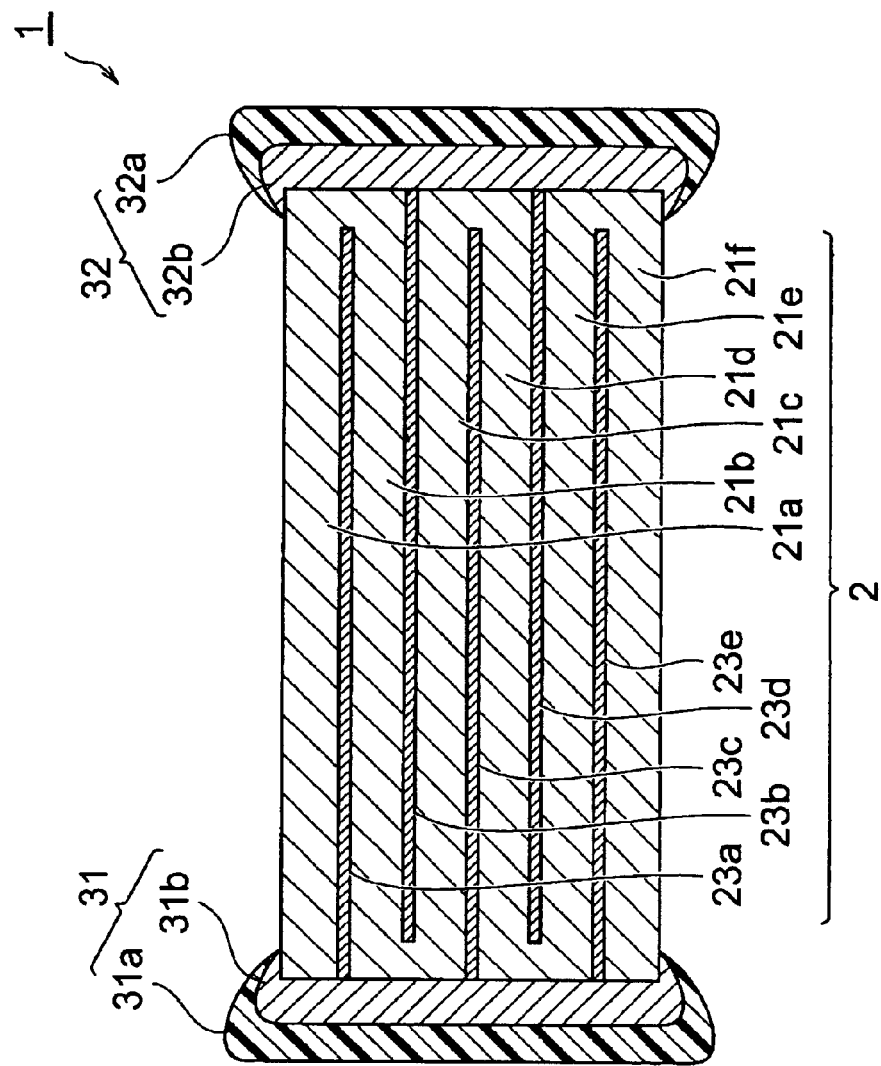
FIG. 1 is a schematic sectional view showing the basic configuration of a preferred embodiment (laminated ceramic capacitor) of the laminate type electronic component in accordance with the present invention.
Figure 2:
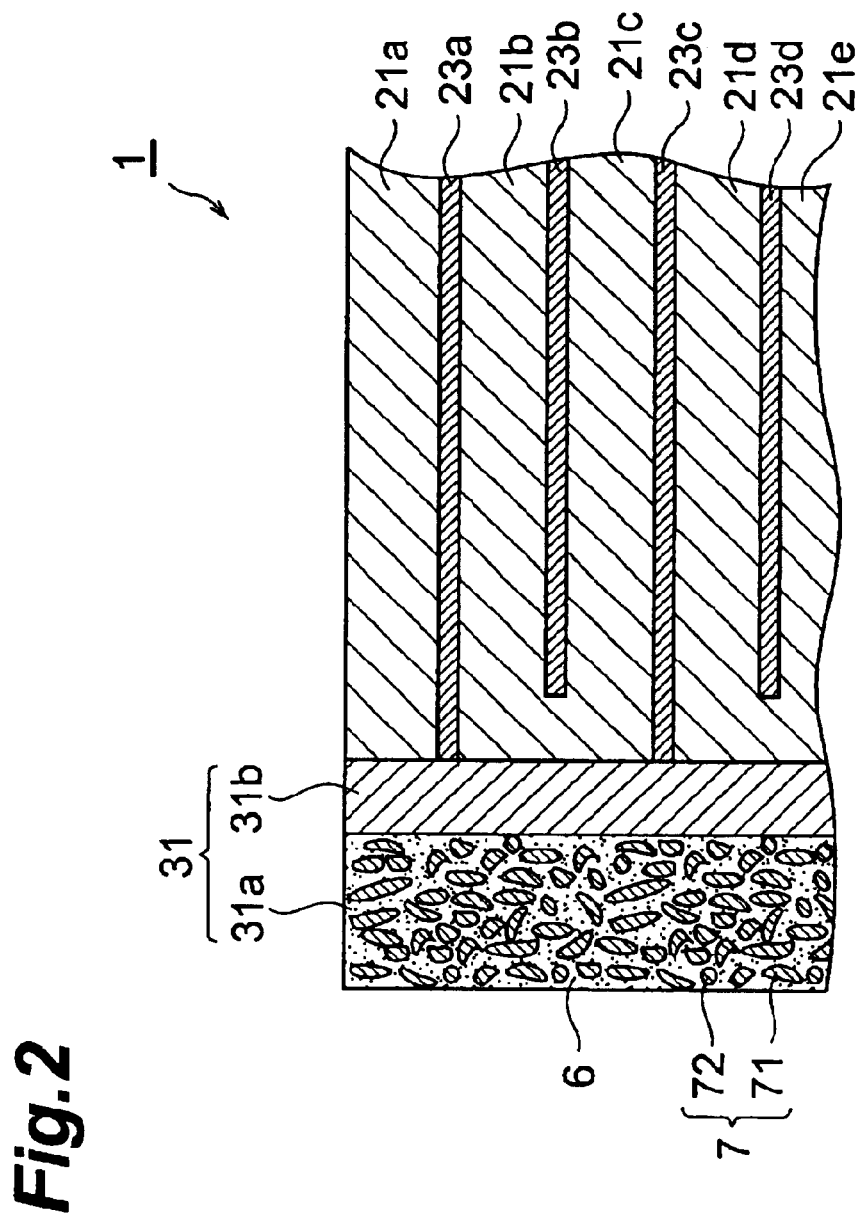
FIG. 2 is a partly enlarged sectional view schematically showing the inner structure of the first and second external electrodes shown in FIG. 1.

FIG. 1 is a schematic sectional view showing the basic configuration of a preferred embodiment (laminated ceramic capacitor) of the laminate type electronic component in accordance with the present invention. FIG. 2 is a partly enlarged sectional view schematically showing the inner structure of the first and second external electrodes shown in FIG. 1.

The laminated ceramic capacitor 1 shown in FIG. 1 comprises a dielectric part 2 containing a dielectric as a constituent material, and a pair of a first external electrode 31 and a second external electrode 32, each disposed in close contact with the dielectric part 2, opposing each other by way of the dielectric part 2.

The dielectric part 2 comprises at least two internal electrodes (electrode plates 23a to 23e which will be explained later) each electrically connected to one of the first external electrode 31 and second external electrode 32, and at least one dielectric layer made of the dielectric and disposed one by one between electrodes adjacent each other in the at least two internal electrodes.

At least one of the at least two internal electrodes is electrically connected to the first external electrode, and at least one of the at least two internal electrodes is electrically connected to the second external electrode.

More specifically, in the laminated ceramic capacitor 1 shown in FIG. 1, the dielectric part 2 made of a dielectric is constituted by six dielectric layers 21a to 21f and five rectangular electrode plates 23a to 23e. The dielectric layers 21a to 21f are configured such that the dielectric layer 21a is disposed on one bottom face of the dielectric part 2 having a substantially rectangular parallelepiped shape, and the dielectric layers 21b to 21f are successively disposed thereon.

The electrode plates 23a to 23e to become the internal electrodes are disposed between the dielectric layers 21b and 21c, between the dielectric layers 21c and 21d, between the dielectric layers 21d and 21e, and between the dielectric layers 21e and 21f, respectively, while in close contact with their corresponding dielectric layers holding them.

The electrode plates 23a, 23c, and 23e are electrically connected to the first external electrode 31, whereas the electrode plates 23b and 23d are connected to the second external electrode 32. Namely, at least two internal electrodes are disposed in the second dielectric part 2 such that one of the two internal electrodes adjacent each other by way of a dielectric layer is electrically connected to the first external electrode 31, whereas the other is electrically connected to the second external electrode 32. This laminated ceramic capacitor 1 functions as a passive device which generates an electrostatic capacity component between each pair of internal electrodes.

The first external electrode 31 and second external electrode 32 will now be explained. For attaining the above-mentioned effects of the present invention, each of the first external electrode 31 and second external electrode 32 has the following configuration.

Namely, as shown in FIG. 2, the first external electrode 31 and second external electrode 32 comprise resin electrode layers 31a and 32a, each made of a conductive resin mainly composed of a thermosetting resin 6 and a conductive particle 7; a metal electrode layer 31b disposed between the resin electrode layer 31a and the dielectric part 2; and a metal electrode layer 32b disposed between the resin electrode layer 32a and the dielectric part 2. Since the resin electrode layers 31a and 32a are connected to the dielectric part 2 by way of the metal electrode layers 31b and 32b, respectively, electric contact states of the resin electrode layers 31a and 32a with the internal electrodes (resin electrode layers 23a to 23e) within the dielectric part 2 can be made better than those in the case where the resin electrode layers 31a and 32a are directly formed on the surface of the dielectric part 2, whereby the electric contact resistance between the dielectric part 2 and the resin electrode layers 31a and 32a occurring when the resin electrode layers 31a and 32a are directly formed on the surface of the dielectric part 2 can sufficiently be lowered in an easy and reliable manner. The resin electrode layers 31a and 32a can physically be secured to the dielectric part 2 more firmly by way of the metal electrode layers 31b, 32b, respectively.

From the viewpoint of sufficiently lowering the above-mentioned electric resistance and from the viewpoint of manufacturing efficiency, the metal electrode layers 31b and 32b are preferably formed by sintering a paste mainly composed of any of metals of Cu, Ag, Pd, Ni, and Ag—Pd alloy, more preferably formed by sintering a paste mainly composed of Cu.

The conductive particle content in the conductive resin in the resin electrode layers 31a and 32a is 70 to 75 mass % as mentioned above.

The conductive particle 7 contains, as main ingredients, acicular particles 71 having an average longitudinal length of 30 to 70 μm and an aspect ratio of 1.5 to 3.3 and spherical particles 72 having an average particle size of 3 to 20 μm. The content of the acicular particles 71 in the conductive particle is 40 to 75 mass %, while the content of the spherical particles 72 in the conductive particle is 15 to 35 mass %.

In the first external electrode 31 and second external electrode 32, both the acicular particles 71 and spherical particles 72 are particles made of Ag.

Examples of the thermosetting resin 6 are epoxy resins, phenol resins, etc. From the viewpoints of heat resistance and high-frequency characteristics, the epoxy resins are preferred in particular among the thermosetting resins.

The electrode plates 23a to 23e are not restricted in particular as long as they have an electronic conductivity usable in a laminated ceramic capacitor, whereby those made of the same constituent material as with internal electrodes mounted to known laminated ceramic capacitors can be used. For example, Cu, Ni, Ag—Pd alloy, etc. can be used.

The configuration explained in the foregoing allows the laminated ceramic capacitor 1 to have an ESR value of 40 to 150 mΩ with a fluctuation (standard deviation) of 10 mΩ or less in the ESR value at the time of operation. Thus, the laminated ceramic capacitor 1 has a DC resistance or impedance within a range usable in a smoothing circuit or the like of a switching power supply circuit having various circuit constants. Namely, the laminated ceramic capacitor 1 has such an excellent reliability that it can sufficiently prevent the oscillation phenomenon from occurring and attain a sufficient smoothing action even when used in a power supply bypass circuit.

The laminated ceramic capacitor 1 can be made by the same thin-film manufacturing technique as with the making of a known laminated ceramic capacitor except that the ingredients contained in the first external electrode 31 and second external electrode 32 and their compositions are adjusted to the conditions mentioned above.

Though a preferred embodiment of the present invention is explained in detail in the foregoing, the present invention is not limited to the above-mentioned embodiment. For example, in the above-mentioned embodiment, an Ni plating layer formed from Ni by plating may further be disposed on the outer surfaces of the resin electrode layers 31a and 32a. Further, in this case, an Sn plating layer formed from Sn by plating may further be disposed on the outer surface of each of the Ni plating layers of the resin electrode layers 31a and 32a.

For example, protective layers (having a thickness of 50 to 100 μm, for example) made of the same constituent material as with the dielectric layers 21a and 21f may further be disposed on respective outer surfaces of the dielectric part 2 (respective outer surfaces of the dielectric layers 21a and 21f).

EXAMPLES

In the following, the laminate type electronic component of the present invention will be explained in further detail with reference to Examples and Comparative Examples. However, the present invention is not restricted to these Examples at all.

Example 1

In the following procedure, the laminated ceramic capacitor shown in FIGS. 1 and 2 was made.

First, using 110 dielectric layers (in each of which a dielectric to become a constituent material was mainly composed of $BaTiO_3$ with a thickness of 2 to 10 μm) having a rectangular parallelepiped shape, and internal electrodes, each formed like a rectangular plate (with a thickness of 1 to 2 μm) made of Ni, disposed one by one between two layers adjacent each other among the dielectric layers, a laminate (green sheet) made of 110 dielectric layers having a configuration in which the internal electrodes alternated with the dielectric layers was made by a known manufacturing technique.

More specifically, a paste containing a dielectric material was prepared, and then each dielectric layer was formed from this paste by doctor blading. Each internal electrode comprising Ni was formed by preparing a Ni paste mainly composed of Ni and then printing this paste on each dielectric layer by a printing process.

Subsequently, the laminate (green sheet) made of 110 dielectric layers having a configuration in which the internal electrodes alternated with the dielectric layers was cut into a rectangular parallelepiped shape, so as to yield an unsintered (unbaked) dielectric part having a rectangular parallelepiped shape (with a length of 3.2 mm×a width of 1.6 mm ×a thickness of 1.6 mm).

Then, the dielectric part was heat-treated in the air under a temperature condition of 400° to 600° C., so as to eliminate the binder component contained in the dielectric part. The resulting dielectric part was further sintered (baked) in the air under a temperature condition of 1250° to 1360° C.

Next, in the following procedure, the first and second external electrodes were formed on surfaces of the resulting sintered (baked) dielectric part. The first and second external electrodes were formed on respective surfaces, parallel to a surface perpendicular to the contact surface of each dielectric layer, opposing each other in the dielectric part having a rectangular parallelepiped shape. First, a paste mainly composed of Cu was prepared and applied to each of the opposing surfaces of the dielectric part, so as to form a coating film constituted by the paste mainly composed of Cu on each of the surfaces opposing each other in the dielectric part. Subsequently, the coating film was dried, and then was heat-treated in the air under a temperature condition of 700° to 800° C., so as to yield a metal electrode layer made of Cu (having a thickness of 10 to 25 μm).

Next, each of the resin electrode layers of the first and second external electrodes was formed by a conductive resin constituted by an epoxy resin, which was a thermosetting resin, and acicular particles (particles made of Ag), which were conductive particles. First, the epoxy resin, which was a thermosetting resin, and the acicular particles (particles made of Ag) were mixed together by using a three-roll apparatus or stone mill, so as to prepare a mixed paste. Subsequently, the mixed paste was diluted with a solvent [a thinner (a mixed liquid of toluene, acetone, and methanol)], so as to adjust its viscosity, and the resulting mixed paste was applied to the above-mentioned pair of opposing side faces of the above-mentioned dielectric part. Then, the coating film was dried, and the curing reaction of the thermosetting resin in the coating film was further advanced, so as to form respective resin electrode layers of the first and second electrodes, each of which is formed into a rectangular plate (with a thickness of 70 to 150 μm).

The conductive particle content in each of the resin electrode layers in the first and second external electrodes was adjusted to the value shown in Table 1. As the acicular particles (particles made of Ag), those having the aspect ratio and average longitudinal direction shown in Table 1 were used.

Since each of the resin electrode layers in the first and second external electrodes was formed from the above-mentioned conductive resin alone as a constituent material, "the conductive particle content in the first external electrode" equals "the conductive particle content in the conductive resin contained in the first external electrode", and "the conductive particle content in the second external electrode" equals "the conductive particle content in the conductive resin contained in the second external electrode".

Examples 2 and 3

Laminated ceramic capacitors were made in the same procedure under the same condition as with Example 1 except that respective conductive particle contents in each of the resin electrode layers in the first and second external electrodes were adjusted to their corresponding values shown in Table 1, and that respective particles having their corresponding aspect ratios and average longitudinal lengths shown in Table 1 were used as the acicular particles (particles made of Ag).

Examples 4 to 15

Laminated ceramic capacitors were made in the same procedure under the same condition as with Example 1 except that respective conductive particle contents in each of the resin electrode layers in the first and second external electrodes were adjusted to their corresponding values shown in Table 1, that respective particles having their corresponding aspect ratios and average longitudinal lengths shown in Table 1 were used as the acicular particles (particles made of Ag), and that respective particles having their corresponding average particle sizes shown in Table 1 were used as spherical particles (particles made of Ag).

Comparative Examples 1 and 2

Laminated ceramic capacitors were made in the same procedure under the same condition as with Example 1 except that respective conductive particle contents in each of the resin electrode layers in the first and second external electrodes were adjusted to their corresponding values shown in Table 1, that respective particles having their corresponding aspect ratios and average longitudinal lengths shown in Table 1 were used as the acicular particles (particles made of Ag), and that respective particles having their corresponding average particle sizes shown in Table 1 were used as spherical particles (particles made of Ag).

Comparative Examples 3 and 4

Laminated ceramic capacitors were made in the same procedure under the same condition as with Example 1 except that respective conductive particle contents in each of the resin electrode layers in the first and second external electrodes were adjusted to their corresponding values shown in Table 1, and that respective particles having their corresponding aspect ratios and average longitudinal lengths shown in Table 1 were used as the acicular particles (particles made of Ag).

Comparative Examples 5 and 6

Laminated ceramic capacitors were made in the same procedure under the same condition as with Example 1 except that respective conductive particle contents in each of the resin electrode layers in the first and second external electrodes were adjusted to their corresponding values shown in Table 1, that respective particles having their corresponding aspect ratios and average longitudinal lengths shown in Table 1 were used as the acicular particles (particles made of Ag), and that respective particles having their corresponding average particle sizes shown in Table 1 were used as spherical particles (particles made of Ag).

Comparative Example 7

A laminated ceramic capacitor was made in the same procedure under the same condition as with Example 1 except that the conductive particle content in each of the resin electrode layers in the first and second external electrodes was adjusted to the value shown in Table 1, and that particles having the aspect ratio and average longitudinal length shown in Table 1 were used as the acicular particles (particles made of Ag).

Comparative Example 8

A laminated ceramic capacitor was made in the same procedure under the same condition as with Example 1 except that the conductive particle content in each of the resin electrode layers in the first and second external electrodes was adjusted to the value shown in Table 1, that particles having the aspect ratio and average longitudinal length shown in Table 1 were used as the acicular particles (particles made of Ag), and that particles having the average particle size shown in Table 1 were used as spherical particles (particles made of Ag).

Capacitor Characteristic Evaluation Test

Each of the laminated ceramic capacitors in accordance with Examples 1 to 14 and Comparative Examples 1 to 8 was connected to a measurement terminal of a measuring device of an impedance analyzer (made by Hewlett-Packard Co. under the product name of 4294A), so as to measure its ESR value. For measuring the ESR value, the frequency was swept once over the range from 100 Hz to 100 MHz, and the value at a self-resonance frequency f0 was determined as the ESR value. For each laminated ceramic capacitor, 10 measurement operations were carried out, so as to calculate the arithmetic average value of ESR values and their standard deviation. The results are shown in Table 1.

TABLE 1

| CONDUCTIVE PARTICLE CONTAINED IN $1^{ST}$ AND $2^{ND}$ EXTERNAL ELECTRODES | | | | | | |
|---|---|---|---|---|---|---|
| CONDUCTIVE PARTICLE | ACICULAR PARTICLE | | | SPHERICAL PARTICLE | | |
| CONTENT (MASS %) IN CONDUCTIVE RESIN | CONTENT (MASS %) IN CONDUCTIVE RESIN | AVERAGE LON- | | CONTENT (MASS %) IN CONDUCTIVE RESIN | AVERAGE | CHARACTERISTIC EVALUATION TEST RESULTS ESR |

| | (1ST OR 2ND EXTERNAL ELECTRODE) | (1ST OR 2ND EXTERNAL ELECTRODE) | GITUDINAL LENGTH (μm) | ASPECT RATIO | (1ST OR 2ND EXTERNAL ELECTRODE) | PARTICLE SIZE (μm) | ESR VALUE (mΩ) | VALUE SD (mΩ) |
|---|---|---|---|---|---|---|---|---|
| EXAMPLE 1 | 75 | 75 | 52 | 1.5 | 0 (NOT CONTAINED) | — | 40~70 | 4 |
| EXAMPLE 2 | 75 | 75 | 52 | 2.0 | 0 (NOT CONTAINED) | — | 40~70 | 5 |
| EXAMPLE 3 | 75 | 75 | 52 | 3.3 | 0 (NOT CONTAINED) | — | 40~80 | 6 |
| EXAMPLE 4 | 75 | 60 | 30 | 2.0 | 15 | 12 | 60~100 | 5 |
| EXAMPLE 5 | 75 | 60 | 48 | 2.0 | 15 | 12 | 70~105 | 4 |
| EXAMPLE 6 | 75 | 60 | 63 | 2.0 | 15 | 12 | 70~115 | 6 |
| EXAMPLE 7 | 75 | 60 | 70 | 2.0 | 15 | 12 | 70~120 | 6 |
| EXAMPLE 8 | 75 | 60 | 48 | 2.0 | 15 | 3 | 80~120 | 7 |
| EXAMPLE 9 | 75 | 60 | 48 | 2.0 | 15 | 5 | 60~110 | 6 |
| EXAMPLE 10 | 75 | 60 | 48 | 2.0 | 15 | 18 | 75~125 | 7 |
| EXAMPLE 11 | 75 | 60 | 48 | 2.0 | 15 | 20 | 80~120 | 8 |
| EXAMPLE 12 | 75 | 50 | 52 | 2.8 | 25 | 12 | 60~110 | 7 |
| EXAMPLE 13 | 75 | 40 | 52 | 2.0 | 35 | 12 | 75~125 | 8 |
| EXAMPLE 14 | 70 | 40 | 52 | 2.0 | 30 | 12 | 80~130 | 8 |
| EXAMPLE 15 | 75 | 60 | 48 | 2.0 | 15 | 30 | 40~150 | 8 |
| COMPARATIVE EXAMPLE 1 | 70 | 10 | 10 | 2.0 | 60 | 10 | 3~7 | 1 |
| COMPARATIVE EXAMPLE 2 | 90 | 80 | 45 | 1.3 | 10 | 10 | 10~30 | 5 |
| COMPARATIVE EXAMPLE 3 | 90 | 90 | 52 | 2.0 | 0 (NOT CONTAINED) | — | 10~35 | 6 |
| COMPARATIVE EXAMPLE 4 | 75 | 75 | 52 | 1.2 | 0 (NOT CONTAINED) | — | ND CONDUCTIVITY | — |
| COMPARATIVE EXAMPLE 5 | 75 | 60 | 23 | 2.0 | 15 | 12 | 70~200 | 30 |
| COMPARATIVE EXAMPLE 6 | 75 | 60 | 78 | 2.0 | 15 | 12 | 85~250 | 37 |
| COMPARATIVE EXAMPLE 7 | 75 | 75 | 52 | 4.0 | 0 (NOT CONTAINED) | — | 40~150 | 20 |
| COMPARATIVE EXAMPLE 8 | 65 | 35 | 52 | 2.0 | 30 | 12 | NO CONDUCTIVITY | — |

The results of the laminated ceramic capacitors in accordance with Examples 1 to 3 shown in Table 1 have verified that even the external electrodes (first and second external electrodes) containing the acicular particles alone have such an excellent reliability that the oscillation phenomenon can sufficiently be prevented from occurring and a sufficient smoothing action can be obtained.

The results of the laminated ceramic capacitors in accordance with Examples 4 to 15 have verified that the external electrodes (first and second external electrodes) containing the acicular particles and spherical particles also have such an excellent reliability that the oscillation phenomenon can sufficiently be prevented from occurring and a sufficient smoothing action can be obtained.

As in the foregoing, it has been verified that the laminated ceramic capacitors in accordance with Examples 1 to 15 can yield laminated ceramic capacitors having an ESR value within a wide range of 40 to 150 mΩ with a standard deviation of 10 mΩ or less in the ESR value, which can sufficiently be used in a smoothing circuit of a power supply circuit, etc.

INDUSTRIAL APPLICABILITY

As explained in the foregoing, the present invention can easily and reliably yield a laminate type electronic component having an ESR value of 40 to 150 mΩ with a fluctuation (standard deviation) of 10 mΩ or less in the ESR value at the time of operation. This can provide a laminate type-electronic component having such an excellent reliability that the oscillation phenomenon can sufficiently be prevented from occurring and a sufficient smoothing action can be obtained even when used in a power supply bypass circuit, while having a configuration excellent in mass productivity.

What is claimed is:

1. A laminate type electronic component comprising at least:
   a dielectric part containing a dielectric as a constituent material; and
   a pair of first and second external electrodes, each disposed in close contact with the dielectric part, opposing each other by way of the dielectric part;
   wherein the dielectric part comprises at least two internal electrodes each electrically connected to one of the first and second external electrodes, and at least one dielectric layer made of the dielectric and disposed one by one between electrodes adjacent each other in the at least two internal electrodes;
   wherein at least one of the at least two internal electrodes is electrically connected to the first external electrode, and at least one of the at least two internal electrodes is electrically connected to the second external electrode;
   wherein each of the first and second external electrodes comprises at least a resin electrode layer made of a conductive resin mainly composed of a thermosetting resin and a conductive particle;
   wherein the conductive resin has a conductive particle content of 70 to 75 mass %; and
   wherein the conductive particle contains an acicular particle having an average longitudinal length of 30 to 70 μm and an aspect ratio of 1.5 to 3.3 as a main ingredient.

2. The laminate type electronic component according to claim 1, wherein the acicular particle contained in the conductive resin has a content of 40 to 75 mass % therein.

3. The laminate type electronic component according to claim 1, wherein the conductive particle further contains a spherical particle having an average particle size of 3 to 20 μm;

wherein the acicular particle has a content of 40 to 75 mass % in the conductive particle; and wherein the spherical particle has a content of 15 to 35 mass % in the conductive particle.

4. The laminate type electronic component according to claim 1, wherein the acicular particle is a particle comprising Ag.

5. The laminate type electronic component according to claim 3, wherein the spherical particle is a particle comprising Ag.

6. The laminate type electronic component according to claim 1, wherein each of the first and second external electrodes is further provided with a metal electrode layer comprising a metal disposed between the resin electrode layer and dielectric part.

7. The laminate type electronic component according to claim 6, wherein the metal electrode layer is formed by sintering a paste mainly composed of any of metals of Cu, Ag, Pd, Ni, and Ag—Pd alloy.

8. The laminate type electronic component according to claim 1, wherein a Ni plating layer formed from Ni by plating is further disposed on an outer surface of the resin electrode layer.

9. The laminate type electronic component according to claim 8, wherein an Sn plating layer formed from Sn by plating is further disposed on an outer surface of the Ni plating layer.

10. The laminate type electronic component according to claim 1, wherein the at least two internal electrodes are disposed in the dielectric part such that one of the two internal electrodes adjacent each other by way of the dielectric layer is electrically connected to the first external electrode whereas the other is electrically connected to the second external electrode.

11. The laminate type electronic component according to claim 1, having an equivalent series resistance value of 40 to 150 mΩ with a standard deviation of 10 mΩ or less in the equivalent series resistance value obtained at the time of operation.

12. The laminate type electronic component according to claim 11, wherein the standard deviation of the equivalent series resistance value is 8 mΩ or less.

* * * * *